(12) United States Patent
Zhang et al.

(10) Patent No.: US 12,538,313 B2
(45) Date of Patent: Jan. 27, 2026

(54) UPLINK CHANNEL MULTIPLEXING METHOD AND DEVICE, AND TERMINAL

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Yi Zhang, Beijing (CN); Liang Xia, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 570 days.

(21) Appl. No.: 17/915,182

(22) PCT Filed: Apr. 8, 2021

(86) PCT No.: PCT/CN2021/085928
§ 371 (c)(1),
(2) Date: Sep. 28, 2022

(87) PCT Pub. No.: WO2021/204195
PCT Pub. Date: Oct. 14, 2021

(65) Prior Publication Data
US 2023/0118930 A1    Apr. 20, 2023

(30) Foreign Application Priority Data
Apr. 8, 2020    (CN) .......................... 202010267840.X

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04W 72/12* (2013.01); *H04W 72/232* (2023.01); *H04W 72/56* (2023.01)

(58) Field of Classification Search
CPC ................. H04W 72/21; H04W 72/56; H04W 72/232; H04W 72/12; H04M 15/39; H04L 1/08; H04L 1/1812
(Continued)

(56) References Cited

U.S. PATENT DOCUMENTS

2018/0132229 A1    5/2018    Li
2020/0196343 A1    6/2020    Marinier et al.
(Continued)

FOREIGN PATENT DOCUMENTS

CN    108293242 A    7/2018
CN    109802819 A    5/2019
(Continued)

OTHER PUBLICATIONS

Qualcomm Incorporated: "Summary of remaining issues for UCI piggyback on PUSCH", 3GPP Draft; R1-1803332 Summary of Remaining Issues for UCI Multiplexing on PUSCH-Version 3, 3rd Generation Partnership Project (3GPP), Mobile Competence Centre; 650, Route Des Lucioles; F-06921 SO, vol. RAN WG1, No. Athens, Greece; 20180226-20180302 Feb. 27, 2018 (Feb. 27, 2018), XP051398480, the whole document. 10 pages.
(Continued)

*Primary Examiner* — Margaret G Webb
(74) *Attorney, Agent, or Firm* — Cooper Legal Group, LLC

(57) ABSTRACT

Embodiments of the present application provide an uplink channel multiplexing method and device, and a terminal. When a terminal would transmit multiple overlapping Physical Uplink Control Channels (PUCCHs) and/or Physical Uplink Shared Channels (PUSCHs) in a same slot or sub-slot, if one of the PUCCH transmissions or PUSCH transmissions is in response to a Downlink Control Information (DCI) format detected by the terminal, the terminal expects that a start symbol S0 of an earliest PUCCH or PUSCH of the overlapping PUCCHs and/or PUSCHs satisfies a first condition

31

The method comprises: when a terminal needs to transmit a plurality of overlapping physical uplink control channels (PUCCHs) and/or physical uplink shared channels (PUSCHs) on the same time slot or sub slot, if one of the PUCCH transmissions or PUSCH transmissions corresponds to the format of downlink control information (DCI) detected by the terminal, the terminal expects that a start symbol S0 of the earliest PUCCH or PUSCH in the overlapping PUCCHs and/or PUSCHs satisfies a first condition. The solution of the present application can avoid the case of an error and the case that a base station cannot control a terminal, satisfies latency and reliability requirements of a URLLC service, and improves system spectral efficiency.

5 Claims, 5 Drawing Sheets

(51) Int. Cl.
  *H04W 72/12* (2023.01)
  *H04W 72/232* (2023.01)
  *H04W 72/56* (2023.01)
(58) Field of Classification Search
  USPC .................................................. 370/329, 336
  See application file for complete search history.

(56) References Cited

U.S. PATENT DOCUMENTS

| 2020/0344032 | A1* | 10/2020 | Yang | ................. | H04W 72/0453 |
| 2021/0092762 | A1 | 3/2021 | Choi et al. | | |
| 2022/0167381 | A1* | 5/2022 | Xu | ......................... | H04L 5/0048 |
| 2022/0191882 | A1* | 6/2022 | Lee | ........................ | H04W 72/56 |
| 2022/0312445 | A1* | 9/2022 | Yin | ........................ | H04L 1/1664 |

FOREIGN PATENT DOCUMENTS

| CN | 110505698 A | 11/2019 |
| CN | 110784914 A | 2/2020 |
| EP | 3796727 A1 | 3/2021 |
| WO | 2018231728 A1 | 12/2018 |
| WO | 2019137432 A1 | 7/2019 |
| WO | 2019216729 A1 | 11/2019 |
| WO | 2020032753 A1 | 2/2020 |
| WO | 2021161720 A1 | 8/2021 |

OTHER PUBLICATIONS

Ericsson, "Text proposals from email discussion [100e-NRLTE_NR_DC_CA_enh-ScellDormancy-01]", 3GPP TSG-RAN WG1 #100-e R1-2001419 e-Meeting, Feb. 24-Mar. 6, 2020, the whole document, 10 pages.
"Remaining Issues for UL Control", 3GPP TSG RAN WG1 Meeting #94, R1-1808893, Aug. 2018, Source: OPPO, Gothenburg, Sweden, 8 pgs.
"Physical Layer Procedures for Control", Dec. 2019, 3GPP. 3GPP TS 38.213, V16.0.0, Technical Specification Group Radio Access Network; NR; (Release 16), 146 pgs.
"Maintenance for Physical Uplink Control Channel", Aug. 2018, 3GPP TSG RAN WG1 Meeting #94, R1-1809142, Source: NTT DoCoMo, Inc., 22 pgs.
"UCI Enhancements for URLLC", Nov. 2018, 3GPP TSG RAN WG1 Meeting #95, R1-1812222, Source: Huawei, HiSilicon, Spokane, USA, 8 pgs.
International Search Report in the international application No. PCT/CN2021/085928, mailed on Jul. 14, 2021, 3 pgs.
English translation of the Written Opinion of the International Search Authority in the international application No. 6 PCT/CN2021/085928, mailed on Jul. 14, 2021,6 pgs.
"UCI Enhancement for URLLC", Nov. 2019, Source: Motorola Mobility, Lenovo, 3GPP TSG RAN WG1, Meeting #99; R1-1912851, 3rd Generation Partnership Project (3GPP), Mobile Competence Centre; 650, Route Des Lucioles; F-06921 Reno, USA; 3 pages.
"UCI Enhancements for URLLC", Apr. 2019, Source: Sharp; 3GPP TSG RAN WG1 #96bis; R1-1905396, 3rd Generation Partnership Project (3GPP), Mobile Competence Centre; 650, Route Des Lucioles; Xi' an, China; 3 pages.
"UCI Enhancements for URLLC", May 2019; Source: OPPO; 3GPP TSG RAN WG1 #97; R1-1906448, 3rd Generation Partnership Project (3GPP), Mobile Competence Centre; 650, Route Des Lucioles; F-06921 Reno, USA; 8 pages.
Office Action of the Indian application No. 202217062744, issued on Aug. 23, 2023. 6 pages with English translation.
Supplementary European Search Report in the European application No. 21784689.8, mailed on Sep. 4, 2023. 9 pages.
VIVO: "Enhancement for Scheduling/HARQ/CSI processing timeline", 3GPP Draft; R1-1901695 Enhancement for Schedulingharqcsi Processing, 3rd Generation Partnership Project (3GPP), Mobile Competence ETRE;, Oute Des Lucioles; F-61 Sopia Antipolis Cedex; FR vol. RAN WG1, No. Athens, Greece; Feb. 25, 2019-Mar. 1, 2019, Feb. 16, 2019 (Feb. 16, 2019), XP051599391, pp. 1-10.

* cited by examiner

When a terminal would transmit multiple overlapping Physical Uplink Control Channels (PUCCHs) and/or Physical Uplink Shared Channels (PUSCHs) in a same slot or sub-slot, if one of the PUCCH transmissions or PUSCH transmissions is in response to a Downlink Control Information (DCI) format detected by the terminal, the terminal expects that a start symbol S0 of an earliest PUCCH or PUSCH of the overlapping PUCCHs and/or PUSCHs satisfies a first condition

UPLINK CHANNEL MULTIPLEXING METHOD AND DEVICE, AND TERMINAL

CROSS-REFERENCE TO RELATED APPLICATION

This application is based upon and claims priority to Chinese Patent Application No. 202010267840.X, filed on Apr. 8, 2020, and the disclosure of which is hereby incorporated by reference in its entirety.

TECHNICAL FIELD

The present disclosure relates to the field of communication technologies, and in particular, to a method and device for uplink channel multiplexing, and a terminal.

BACKGROUND

In Release 15 (R15), the multiplexing mechanism of a Physical Uplink Control Channel (PUCCH) and a Physical Uplink Shared Channel (PUSCH) includes the following.
1. A processing timeline is determined. That is to say, in all overlapping PUCCH(s) and PUSCH(s), the earliest PUCCH or PUSCH is found, a first symbol S0 is required to guarantee that a Physical Downlink Shared Channel (PDSCH) (if any) is processed, release (if any) of Semi-Persistent Scheduling (SPS) is processed, the PUSCH (if any) is processed, and a Channel State Information (CSI) report (if any) is processed. If the processing timeline is not satisfied, it is determined as an error.
2. A PUCCH resource set Q is constructed, and at least one PUCCH/PUSCH resource is selected according to a certain rule.
3. The content that is required to be multiplexed in the selected PUCCH(s)/PUSCH(s) resource is determined. If the limitation of the maximum bitrate of the PUCCH (s)/PUSCH(s) is not satisfied, low-priority Uplink Control Information (UCI), such as CSI part 2, is discarded.

An Release 16 (R16) eURLLC topic includes content of intra-UE multiplexing (multiplexing between terminals), that is, a multiplexing method in which the same terminal includes not only an Enhanced Mobile Broadband (eMBB) service but also an Ultra-reliable and Low Latency Communications service. Taking multiplexing of eMBB Hybrid Automatic Repeat Request ACK (HARQ-ACK) and URLLC HARQ-ACK as an example, the following options are available.

If the eMBB HARQ-ACK (that is, low priority) conflicts with the URLLC (that is, high priority) HARQ-ACK, the following options can be selected:
Option 1: disabling The eMBB HARQ-ACK.
Option 2: if a multiplexing rule is satisfied, multiplexing eMBB HARQ-ACK and URLLC HARQ-ACK; otherwise, discarding the eMBB HARQ-ACK.
In the prior art, there are at least the following problems.
Problem 1: in R15, during the uplink multiplexing, determination of the processing timeline is not suitable for the scenario of intra-UE multiplexing. As shown in FIG. 1, the processing time of the URLLC HARQ-ACK is shorter than the processing time of the eMBB HARQ-ACK. If A the rule of R15 is used, the processing timeline is determined to be unsatisfied, which is an error situation.
Problem 2: the HARQ-ACK of URLLC has higher latency and reliability requirements than the eMBB HARQ-ACK. Therefore, as shown in FIG. 2, the latency and reliability requirements of the URLLC HARQ-ACK cannot be satisfied after multiplexing the URLLC HARQ-ACK and the eMBB HARQ-ACK according to the rule of R15.

SUMMARY

The present disclosure provides a method and device for uplink channel multiplexing, and a terminal. By means of determining processing timelines for different services respectively, removing the PUCCH resource that does not satisfy the processing timelines or latency from a PUCCH resource set and coding different uplink services respectively, error can be avoided, the processing case that a base station cannot control a terminal can be avoided, and the latency and reliability requirements of URLLC services can also be satisfied, thereby improving system spectral efficiency.

In order to resolve the above technical problem, embodiments of the present disclosure provide the following solutions.

A method for uplink channel multiplexing is applied to a terminal and includes the following operation.

When a terminal would transmit multiple overlapping Physical Uplink Control Channels (PUCCHs) and/or Physical Uplink Shared Channels (PUSCHs) in a same slot or sub-slot, if one of the PUCCH transmissions or PUSCH transmissions is in response to a Downlink Control Information (DCI) format detected by the terminal, expecting, by the terminal, that a start symbol S0 of an earliest PUCCH or PUSCH among the overlapping PUCCHs and/or PUSCHs satisfies a first condition.

Optionally, the first condition satisfied by the start symbol S0 of the earliest PUCCH or PUSCH among the overlapping PUCCHs and/or PUSCHs includes at least one of the following.

S0 is not before a first symbol, a Cyclic Prefix (CP) of the first symbol starts at a first time after a last symbol of any corresponding PDSCH, and Hybrid Automatic Repeat reQuest-ACK (HARQ-ACK) corresponding to the any corresponding PDSCH has a same first priority index; and/or S0 is not before a second symbol, a CP of the second symbol starts at a second time after the last symbol of any corresponding PDSCH, and the HARQ-ACK corresponding to the any corresponding PDSCH has a same second priority index.

S0 is not before a third symbol, a CP of the third symbol starts at a third time after a last symbol of any Semi-Persistent Scheduling (SPS) PDSCH release, and an HARQ-ACK corresponding to the any SPS PDSCH release has the same first priority index; and/or S0 is not before a fourth symbol, a CP of the fourth symbol starts at a fourth time after the last symbol of any SPS PDSCH release, and the HARQ-ACK corresponding to the any SPS PDSCH release has the same second priority index.

When there is no aperiodic Channel State Information (CSI) report multiplexed in a PUSCH in the overlapping PUCCHs and/or PUSCHs, S0 is not before a fifth symbol, a CP of the fifth symbol starts at a fifth time after a last symbol of any PDCCH with a DCI format that carries and scheduling an overlapping PUSCH and any PDCCH that schedules the PDSCH or SPS PDSCH release, the HARQ-ACK of the PDSCH or the SPS PDSCH release is in an overlapping PUCCH and has the same first priority index, and the any PUSCH has the same first priority index; and/or S0 is not before a sixth symbol, a CP of the sixth symbol starts at a sixth time after the last symbol of any PDCCH with a DCI format scheduling an overlapping PUSCH and any PDCCH that schedules the PDSCH or SPS PDSCH release, where the HARQ-ACK of the PDSCH or the SPS PDSCH release is in an overlapping PUCCH and has the same second priority index, and the any PUSCH has the same second priority index.

When there is an aperiodic CSI report multiplexed in a PUSCH in the overlapping PUCCHs and/or PUSCHs, S0 is not before a seventh symbol, a CP of the seventh symbol starts at a seventh time after the last symbol of any PDCCH with a DCI format scheduling an overlapping PUSCH and any PDCCH that schedules the PDSCH or SPS PDSCH release, where the HARQ-ACK of the PDSCH or the SPS PDSCH release is in an overlapping PUCCH and has the same first priority index, and the any PUSCH has the same first priority index; and/or S0 is not before an eighth symbol, a CP of the eighth symbol starts at an eighth time after the last symbol of any PDCCH with a DCI format scheduling an overlapping PUSCH and any PDCCH that schedules the PDSCH or SPS PDSCH release, where the HARQ-ACK of the PDSCH or the SPS PDSCH release is in an overlapping PUCCH and has the same second priority index, and the any PUSCH has the same second priority index.

Optionally, the method for uplink channel multiplexing further includes the following operations.

A resource set is determined. The resource set includes resources for transmitting the PUCCH in a single slot or sub-slot.

If the PUCCH resource cannot satisfy the first condition, the PUCCH resource is removed from the resource set.

If the PUCCH resource cannot satisfy a first latency requirement, the PUCCH resource is removed from the resource set.

If the PUCCH resource cannot satisfy a first reliability requirement, the PUCCH resource is removed from the resource set.

Optionally, the operation of removing the PUCCH resource from the resource set if the PUCCH resource cannot satisfy a first latency requirement includes the following operation.

If an end symbol of the PUCCH resource is later than X symbols after an end symbol of a first PUCCH resource, the PUCCH resource is removed from the resource set, where X is an integer. The first PUCCH resource is a PUCCH resource that is determined according to a high layer signaling and/or a physical layer control signaling sent by a network device and carries UCI of the first priority index.

Optionally, X is predetermined, or configured by the network device by means of the high layer signaling, or a value, indicated by means of physical layer downlink control signaling, in a set determined in a predetermined manner or by high layer signaling configuration.

Optionally, the operation of removing the PUCCH resource from the resource set if the PUCCH resource cannot satisfy a first reliability requirement includes the following operation.

In a case that a maximum bitrate of the PUCCH resource determined according to the high layer signaling is higher than a maximum bitrate of the first PUCCH resource by a first preset value, or the maximum bitrate of the PUCCH resource is higher than a second preset value, removing the PUCCH resource from the resource set, wherein the first PUCCH resource is a PUCCH resource that is determined according to at least one of a high layer signaling or a physical layer control signaling sent by a network device and carries UCI of a first priority index.

Optionally, at least one of the first preset value or the second preset value is predetermined, or configured by a base station by means of the high layer signaling; or a value, indicated by means of physical layer downlink control signaling, in a set determined in a predetermined manner or by high layer signaling configuration.

Optionally, the method for uplink channel multiplexing further includes the following operation.

Bitrates of the UCI of different priority indexes transmitted in the PUCCH are determined and/or content transmitted on the PUCCH in the resource set is determined.

Optionally, the operation of determining the bitrates of the UCI of different priority indexes transmitted in the PUCCH includes the following operations.

The bitrate of UCI of the first priority index is determined to be: a lowest maximum bitrate in the maximum bitrates of the PUCCH indicated according to corresponding high layer configuration and/or physical layer downlink control information, or a bitrate of the PUCCH in the resource set; and the bitrate of UCI of the second priority index is determined to be: the lowest maximum bitrate in the maximum bitrates of the PUCCH indicated according to the corresponding high layer configuration and/or the physical layer downlink control information, or the bitrate of the PUCCH in the resource set.

Optionally, the operation of determining the content transmitted in the PUCCH in the resource set includes the following operations.

The PUCCH is required to transmit a first UCI set, in a case that a number of bits that can be carried by the PUCCH resource, that is determined according to a number of Physical Resource Blocks (PRBs) configured in the PUCCH and a modulation order and bitrate of the first UCI set, is greater than or equal to a number of bits of the first UCI set, a minimum number of PRBs is determined to be a first number of PRBs according to the number of bits of the first UCI set, the number of PRBs configured in the PUCCH, and the modulation order and bitrate of the first UCI set, and the first UCI set is transmitted by using the first number of PRBs.

In a case that the number of bits that can be carried by the PUCCH resource, that is determined according to the number of PRBs configured in the PUCCH and the modulation order and bitrate of the UCI, is less than the number of bits of the first UCI set, a second UCI set is transmitted. The second UCI set satisfies the following conditions:

the second UCI set being a sub-set of the first UCI set, and
the number of bits that can be carried by the PUCCH resource, that is determined according to the number of PRBs configured in the PUCCH and the modulation order and bitrate of the second UCI set, being greater than or equal to the number of bits of the second UCI set; and the first UCI set comprising at least one of the following UCI:

a Hybrid Automatic Repeat Request-ACKnowledgement (HARQ-ACK), a Scheduling Request (SR), a wideband Channel State Information (CSI) report, and a sub-band CSI report of the first priority index, wherein a number of bits occupied by the HARQ-ACK of the first priority index is $O_{H\text{-}ACK}$, a number of bits occupied by the SR of the first priority index is $O_{H\text{-}SR}$, and a numbers of bits occupied by each of the wideband CSI report and the sub-band CSI report of the first priority index is $O_{H\text{-}CSI}$; and a HARQ-ACK, an SR, a wideband CSI report, a sub-band CSI report, or a Cyclic Redundancy Check (CRC) of the second priority index, wherein a number of bits occupied by the HARQ-ACK of the second priority index is $O_{L-ACK}$, a number of bits occupied by the SR of the second priority index is $O_{L-SR}$, a numbers of bits occupied by each of the wideband CSI report and the sub-band CSI report of the second priority index is $O_{L-CSI}$, and a number of bits occupied by the CRC of the second priority index is $O_{CRC}$.

Optionally, the operation of determining the second UCI set includes the following operation.

UCI is selected from the first UCI set according to a first sequence, so as to determine the second UCI set.

The first sequence comprises at least one of the following:
the UCI of the first priority index being selected in preference to the UCI of the second priority index;
the HARQ-ACK and the SR being selected in preference to the CSI when the priority index is the same;
a first part of the CSI being selected in preference to a second part of the CSI when the priority index is the same; or
one with a higher priority among the first part of the CSI and the second part of the CSI being selected in preference when the priority index is the same.

An embodiment of the present disclosure further provides a method for uplink channel multiplexing. The method is applied to a terminal and includes the following operations.

A resource set is determined. The resource set includes a PUCCH resource for transmitting a PUCCH in a single slot or sub-slot.

If the PUCCH resource cannot satisfy the first condition, the PUCCH resource is removed from the resource set.

Or, if the PUCCH resource cannot satisfy a first latency requirement, the PUCCH resource is removed from the resource set.

Or, if the PUCCH resource cannot satisfy a first reliability requirement, the PUCCH resource is removed from the resource set.

Optionally, the operation of removing the PUCCH resource from the resource set if the PUCCH resource cannot satisfy a first latency requirement includes the following operation.

In a case that an end symbol of the PUCCH resource is later than X symbols after an end symbol of a first PUCCH resource, removing the PUCCH resource from the resource set, wherein X is an integer, and the first PUCCH resource is a PUCCH resource that is determined according to at least one of a high layer signaling or a physical layer control signaling sent by a network device and carries Uplink Control Information (UCI) of a first priority index.

Optionally, X is predetermined, or configured by the network device by means of the high layer signaling, or a value, indicated by means of physical layer downlink control signaling, in a set determined in a predetermined manner or by high layer signaling configuration.

Optionally, the operation of, if the PUCCH resource cannot satisfy a first reliability requirement, removing the PUCCH resource from the resource set includes the following operation.

In a case that a maximum bitrate of the PUCCH resource determined according to the high layer signaling is higher than a maximum bitrate of the first PUCCH resource by a first preset value, or the maximum bitrate of the PUCCH resource is higher than a second preset value, removing the PUCCH resource from the resource set, wherein the first PUCCH resource is a PUCCH resource that is determined according to at least one of a high layer signaling or a physical layer control signaling sent by a network device and carries UCI of a first priority index.

Optionally, at least one of the first preset value or the second preset value is predetermined, or configured by a base station by means of the high layer signaling; or a value, indicated by means of physical layer downlink control signaling, in a set determined in a predetermined manner or by high layer signaling configuration.

An embodiment of the present disclosure further provides a method for uplink channel multiplexing. The method is applied to a terminal and includes the following operations.

Bitrates of the UCI of different priority indexes transmitted in the PUCCH are determined and/or content transmitted in the PUCCH in a resource set is determined.

Optionally, the operation of determining the bitrates of the UCI of different priority indexes transmitted in the PUCCH includes the following operations.

The bitrate of UCI of the first priority index is determined to be: a lowest maximum bitrate in the maximum bitrates of the PUCCH indicated according to corresponding high layer configuration and/or physical layer downlink control information, or a bitrate of the PUCCH in the resource set; and the bitrate of UCI of the second priority index is determined to be: the lowest maximum bitrate in the maximum bitrates of the PUCCH indicated according to the corresponding high layer configuration and/or the physical layer downlink control information, or the bitrate of the PUCCH in the resource set.

Optionally, the operation of determining the content transmitted in the PUCCH in the resource set includes the following operations.

The PUCCH is required to transmit a first UCI set, in a case that a number of bits that can be carried by the PUCCH resource, that is determined according to a number of Physical Resource Blocks (PRBs) configured in the PUCCH and a modulation order and bitrate of the first UCI set, is greater than or equal to a number of bits of the first UCI set, a minimum number of PRBs is determined to be a first number of PRBs according to the number of bits of the first UCI set, the number of PRBs configured in the PUCCH, and the modulation order and bitrate of the first UCI set, and the first UCI set is transmitted by using the first number of PRBs.

In a case that the number of bits that can be carried by the PUCCH resource, that is determined according to the number of PRBs configured in the PUCCH and the modulation order and bitrate of the UCI, is less than the number of bits of the first UCI set, a second UCI set is transmitted. The second UCI set satisfies the following conditions:
the second UCI set being a sub-set of the first UCI set, and
the number of bits that can be carried by the PUCCH resource, that is determined according to the number of PRBs configured in the PUCCH and the modulation order and bitrate of the second UCI set, being greater than or equal to the number of bits of the second UCI set; and
the first UCI set comprising at least one of the following UCI:
a HARQ-ACK, a Scheduling Request (SR), a wideband Channel State Information (CSI) report, a sub-band CSI report, or a Cyclic Redundancy Check (CRC) of the first priority index, wherein a number of bits occupied by the HARQ-ACK of the first priority index is $O_{L-ACK}$, a number of bits occupied by the SR of the first priority index is $O_{L-SR}$, a number of bits occupied by each of the wideband CSI report and the sub-band CSI report of the first priority index is $O_{L\text{-}CSI}$, and a number of bits occupied by the CRC of the first priority index is $O_{CRC}$.

Optionally, the operation of determining the second UCI set includes the following operation.

UCI is selected from the first UCI set according to a first sequence, so as to determine the second UCI set.

The first sequence comprises at least one of the following:
the UCI of the first priority index being selected in preference to the UCI of the second priority index;
the HARQ-ACK and the SR being selected in preference to the CSI when the priority index is the same;
a first part of the CSI being selected in preference to a second part of the CSI when the priority index is the same; or
one with a higher priority among the first part of the CSI and the second part of the CSI being selected in preference when the priority index is the same.

An embodiment of the present disclosure further provides a device for uplink channel multiplexing. The device is applied to a terminal and includes a transceiving module.

The transceiving module is configured such that when a terminal would transmit multiple overlapping Physical Uplink Control Channels (PUCCHs) and/or Physical Uplink Shared Channels (PUSCHs) in a same slot or sub-slot, if one of the PUCCH transmissions or PUSCH transmissions is in response to a Downlink Control Information (DCI) format detected by the terminal, the terminal expects that a start symbol S0 of an earliest PUCCH or PUSCH among the overlapping PUCCHs and/or PUSCHs satisfies a first condition.

An embodiment of the present disclosure further provides a terminal, including a transceiver.

The transceiver is configured such that when a terminal would transmit multiple overlapping Physical Uplink Control Channels (PUCCHs) and/or Physical Uplink Shared Channels (PUSCHs) in a same slot or sub-slot, if one of the PUCCH transmissions or PUSCH transmissions is in response to a Downlink Control Information (DCI) format detected by the terminal, the terminal expects that a start symbol S0 of an earliest PUCCH or PUSCH among the overlapping PUCCHs and/or PUSCHs satisfies a first condition.

An embodiment of the present disclosure further provides a device for uplink channel multiplexing. The device is applied to a terminal and includes a transceiving module.

The transceiving module is configured to determine a resource set, where the resource set includes a PUCCH resource for transmitting the PUCCH in a single slot or sub-slot; and remove the PUCCH resource that does not satisfy a first condition or a first latency requirement or a first reliability requirement from the resource set.

An embodiment of the present disclosure further provides a terminal, including a processor.

The processor is configured to determine a resource set, where the resource set includes a PUCCH resource for transmitting the PUCCH in a single slot or sub-slot; and remove the PUCCH resource that does not satisfy a first condition or a first latency requirement or a first reliability requirement from the resource set.

An embodiment of the present disclosure further provides a device for uplink channel multiplexing. The device is applied to a terminal and includes a transceiving module.

The transceiving module is configured to determine bitrates of UCI of different priority indexes transmitted on PUCCH and/or determine content transmitted in the PUCCH in a resource set.

An embodiment of the present disclosure further provides a terminal, including a processor.

The processor is configured to determine bitrates of UCI of different priority indexes transmitted on PUCCH and/or determine content transmitted in the PUCCH in a resource set.

An embodiment of the present disclosure further provides a communication device, including a processor and a memory storing a computer program. The computer program, when operated by the processor, implements the method described above.

An embodiment of the present disclosure further provides a computer-readable storage medium, including instructions. The instructions, when running in a computer, cause a computer to performs the method described above.

The above solution of the present disclosure includes at least the following beneficial effects.

According to the above solutions of the present disclosure, by means of determining processing timelines for different services respectively, removing the PUCCH resource that does not satisfy the processing timelines or latency from a PUCCH resource set and coding different uplink services respectively, error can be avoided, the processing case that a base station cannot control a terminal can be avoided, and the latency and reliability requirements of URLLC services can also be satisfied, thereby improving system spectral efficiency.

BRIEF DESCRIPTION OF THE DRAWINGS

FIG. 3 is a schematic flowchart of a method for uplink channel multiplexing according to an embodiment of the present disclosure.

DETAILED DESCRIPTION

Figure 1:
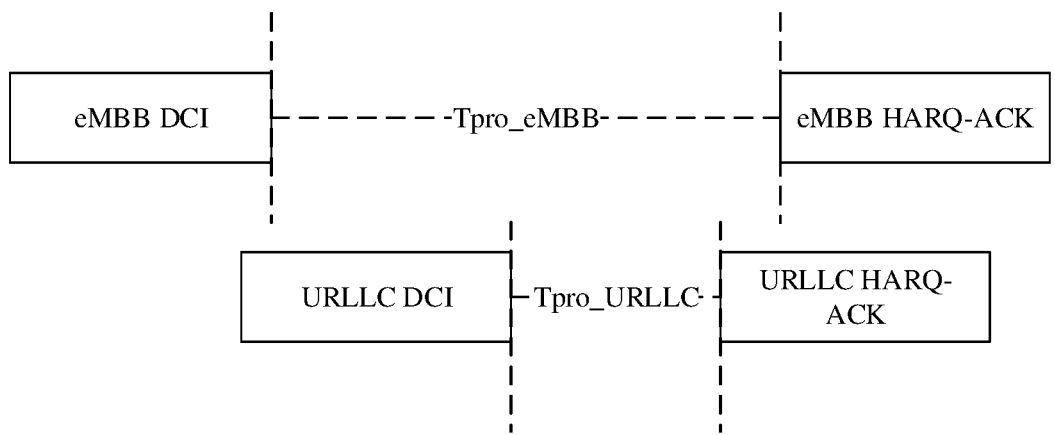
FIG. 1 is a schematic diagram of a scenario that the processing time of URLLC HARQ-ACK is shorter than the processing time of eMBB HARQ-ACK during multiplexing between terminals.
Figure 2:
FIG. 2 is a schematic diagram of a scenario that HARQ-ACK of URLLC has a higher latency and reliability requirements than eMBB HARQ-ACK during multiplexing between terminals.

Exemplary embodiments disclosed in the present disclosure are described in more detail with reference to drawings. Although the exemplary embodiments of the present disclosure are shown in the drawings, it should be understood that the present disclosure may be implemented in various forms and should not be limited by the embodiments described here. On the contrary, these embodiments are provided for more thorough understanding of the present disclosure, and to fully convey a scope disclosed in the embodiments of the present disclosure to a person skilled in the art.

As shown in FIG. 3, an embodiment of the present disclosure provides a method for uplink channel multiplexing. The method is applied to a terminal and includes the following step.

At S31, when a terminal would (i.e., intends to, desires to, or is to) transmit multiple overlapping Physical Uplink Control Channels (PUCCHs) and/or Physical Uplink Shared Channels (PUSCHs) in a same slot or sub-slot, if one of the PUCCH transmissions or PUSCH transmissions is in response to a Downlink Control Information (DCI) format detected by the terminal, expecting, by the terminal, that a start symbol S0 of an earliest PUCCH or PUSCH among the overlapping PUCCHs and/or PUSCHs satisfies a first condition. The first condition here may be a processing timeline condition.

In this embodiment of the present disclosure, a start symbol S0 of the earliest PUCCH or PUSCH among the overlapping PUCCHs and/or PUSCHs is made to satisfy the first condition, and accordingly, error can be avoided, the case that a base station cannot control a terminal can be avoided, and latency and reliability requirements of a URLLC service can be satisfied, thereby improving system spectral efficiency.

In an optional embodiment of the present disclosure, the first condition satisfied by the start symbol S0 of the earliest PUCCH or PUSCH among the overlapping PUCCHs and/or PUSCHs includes at least one of the following.

1) S0 is not before a first symbol, a Cyclic Prefix (CP) of the first symbol starts at a first time after a last symbol of any corresponding PDSCH, and Hybrid Automatic Repeat reQuest-ACK (HARQ-ACK) corresponding to the any corresponding PDSCH has a same first priority index; and/or S0 is not before a second symbol, a CP of the second symbol starts at a second time after the last symbol of any corresponding PDSCH, and the HARQ-ACK corresponding to the any corresponding PDSCH has a same second priority index.

2) S0 is not before a third symbol, a CP of the third symbol starts at a third time after a last symbol of any Semi-Persistent Scheduling (SPS) PDSCH release, and an HARQ-ACK corresponding to the any SPS PDSCH release has the same first priority index; and/or S0 is not before a fourth symbol, a CP of the fourth symbol starts at a fourth time after the last symbol of any SPS PDSCH release, and the HARQ-ACK corresponding to the any SPS PDSCH release has the same second priority index.

3) When there is no aperiodic Channel State Information (CSI) report multiplexed in a PUSCH in the overlapping PUCCHs and/or PUSCHs, S0 is not before a fifth symbol, a CP of the fifth symbol starts at a fifth time after a last symbol of any PDCCH with a DCI format that carries and scheduling an overlapping PUSCH and any PDCCH that schedules the PDSCH or SPS PDSCH release, the HARQ-ACK of the PDSCH or the SPS PDSCH release is in an overlapping PUCCH and has the same first priority index, and the any PUSCH has the same first priority index; and/or S0 is not before a sixth symbol, a CP of the sixth symbol starts at a sixth time after the last symbol of any PDCCH with a DCI format scheduling an overlapping PUSCH and any PDCCH that schedules the PDSCH or SPS PDSCH release, where the HARQ-ACK of the PDSCH or the SPS PDSCH release is in an overlapping PUCCH and has the same second priority index, and the any PUSCH has the same second priority index.

4) When there is an aperiodic CSI report multiplexed in a PUSCH in the overlapping PUCCHs and/or PUSCHs, S0 is not before a seventh symbol, a CP of the seventh symbol starts at a seventh time after the last symbol of any PDCCH with a DCI format scheduling an overlapping PUSCH and any PDCCH that schedules the PDSCH or SPS PDSCH release, where the HARQ-ACK of the PDSCH or the SPS PDSCH release is in an overlapping PUCCH and has the same first priority index, and the any PUSCH has the same first priority index; and/or S0 is not before an eighth symbol, a CP of the eighth symbol starts at eighth time after the last symbol of any PDCCH with a DCI format scheduling an overlapping PUSCH and any the PDCCH that schedules the PDSCH or SPS PDSCH release, where the HARQ-ACK of the PDSCH or the SPS PDSCH release is in an overlapping PUCCH and has the same second priority index, and the any PUSCH has the same second priority index.

In an optional embodiment of the present disclosure, the method for uplink channel multiplexing may further include the following step.

At S32, a resource set is determined, and includes resources for transmitting the PUCCH in a single slot or sub-slot; and PUCCH resources that do not satisfy a first condition or a first latency requirement or a first reliability requirement are removed from the resource set.

In an optional embodiment of the present disclosure, the operation of removing the PUCCH resources that do not satisfy a first condition or a first latency requirement or a first reliability requirement from the resource set may include the following steps.

At S321, if the PUCCH resource cannot satisfy the first condition, the PUCCH resource is removed from the resource set.

At S322, if the PUCCH resource cannot satisfy a first latency requirement, the PUCCH resource is removed from the resource set.

At S323, if the PUCCH resource cannot satisfy a first reliability requirement, the PUCCH resource is removed from the resource set.

In an optional embodiment of the present disclosure, S322 may include the following operation.

If an end symbol of the PUCCH resource is later than X symbols after an end symbol of a first PUCCH resource, the PUCCH resource is removed from the resource set, where X is an integer. The first PUCCH resource is a PUCCH resource that is determined according to a high layer signaling and/or a physical layer control signaling sent by a network device and carries UCI of the first priority index. Optionally, X is predetermined, or configured by the network device by means of the high layer signaling, or a value, indicated by means of physical layer downlink control signaling, in a set determined in a predetermined manner or by high layer signaling configuration.

In an optional embodiment of the present disclosure, S323 may include the following operation.

In a case that a maximum bitrate of the PUCCH resource determined according to the high layer signaling is higher than a maximum bitrate of the first PUCCH resource by a first preset value, or the maximum bitrate of the PUCCH resource is higher than a second preset value, removing the PUCCH resource from the resource set, wherein the first PUCCH resource is a PUCCH resource that is determined according to at least one of a high layer signaling or a physical layer control signaling sent by a network device and carries UCI of a first priority index. Optionally, at least one of the first preset value or the second preset value is predetermined, or configured by a base station by means of the high layer signaling; or a value, indicated by means of physical layer downlink control signaling, in a set determined in a predetermined manner or by high layer signaling configuration.

In an optional embodiment of the present disclosure, the method for uplink channel multiplexing may further include the following step.

At S33, bitrates of the UCI of different priority indexes transmitted in the PUCCH are determined and/or content transmitted in the PUCCH in the resource set is determined. The UCI here may include SR HARQ-ACK and CSI.

Optionally, the operation of determining the bitrates of the UCI of different priority indexes transmitted in the PUCCH includes the following operations.

The bitrate of UCI of the first priority index is determined to be: a lowest maximum bitrate in the maximum bitrates of the PUCCH indicated according to corresponding high layer configuration and/or physical layer downlink control information, or a bitrate of the PUCCH in the resource set; and the bitrate of UCI of the second priority index is determined to be: the lowest maximum bitrate in the maximum bitrates of the PUCCH indicated according to the corresponding high layer configuration and/or the physical layer downlink control information, or the bitrate of the PUCCH in the resource set.

Optionally, the operation of determining the content transmitted in the PUCCH in the resource set includes the following operations.

The PUCCH is required to transmit a first UCI set, in a case that a number of bits that can be carried by the PUCCH resource, that is determined according to a number of Physical Resource Blocks (PRBs) configured in the PUCCH and a modulation order and bitrate of the first UCI set, is greater than or equal to a number of bits of the first UCI set, a minimum number of PRBs is determined to be a first number of PRBs according to the number of bits of the first UCI set, the number of PRBs configured in the PUCCH, and the modulation order and bitrate of the first UCI set, and the first UCI set is transmitted by using the first number of PRBs.

In a case that the number of bits that can be carried by the PUCCH resource, that is determined according to the number of PRBs configured in the PUCCH and the modulation order and bitrate of the UCI, is less than the number of bits of the first UCI set, a second UCI set is transmitted. The second UCI set satisfies the following conditions:

the second UCI set being a sub-set of the first UCI set, and the number of bits that can be carried by the PUCCH resource, that is determined according to the number of PRBs configured in the PUCCH and the modulation order and bitrate of the second UCI set, being greater than or equal to the number of bits of the second UCI set; and the first UCI set comprising at least one of the following UCI:

a Hybrid Automatic Repeat Request-ACKnowledgement (HARQ-ACK), a Scheduling Request (SR), a wideband Channel State Information (CSI) report, and a sub-band CSI report of the first priority index, wherein a number of bits occupied by the HARQ-ACK of the first priority index is $O_{H\text{-}ACK}$, a number of bits occupied by the SR of the first priority index is $O_{H\text{-}SR}$, and a numbers of bits occupied by each of the wideband CSI report and the sub-band CSI report of the first priority index is $O_{H\text{-}CSI}$; and a HARQ-ACK, an SR, a wideband CSI report, a sub-band CSI report, or a Cyclic Redundancy Check (CRC) of the second priority index, wherein a number of bits occupied by the HARQ-ACK of the second priority index is $O_{L\text{-}ACK}$, a number of bits occupied by the SR of the second priority index is $O_{L\text{-}SR}$, a numbers of bits occupied by each of the wideband CSI report and the sub-band CSI report of the second priority index is $O_{L\text{-}CSI}$, and a number of bits occupied by the CRC of the second priority index is $O_{CRC}$.

The operation of determining the second UCI set includes the following operation.

UCI is selected from the first UCI set according to a first sequence, so as to determine the second UCI set.

The first sequence comprises at least one of the following:
the UCI of the first priority index being selected in preference to the UCI of the second priority index;
the HARQ-ACK and the SR being selected in preference to the CSI when the priority index is the same;
a first part of the CSI being selected in preference to a second part of the CSI when the priority index is the same; or
one with a higher priority among the first part of the CSI and the second part of the CSI being selected in preference when the priority index is the same.

The first sequence includes the following execution sequences, for example.

1) According to a sequence of priority from high to low, the first sequence may be: first priority index HARQ-ACK/SR>first priority index CSI>second priority index HARQ-ACK/SR>second priority index CSI part 1>second priority index CSI part 2.

2) According to a sequence of priority from high to low, the first sequence may also be: first priority index HARQ-ACK/SR>second priority index HARQ-ACK/SR>first priority index CSI>second priority index CSI part 1>second priority index CSI part 2.

The following content applies to both items 1) and 2). In CSI part 1 and CSI part 2, selection is performed according to the sequence of priorities from high to low.

According to the above embodiments of the present disclosure, by means of determining processing timelines for different services respectively, removing the PUCCH resource that does not satisfy the processing timelines or latency from a PUCCH resource set and coding different uplink services respectively, error can be avoided, the processing case that a base station cannot control a terminal can be avoided, and the latency and reliability requirements of URLLC services can also be satisfied, thereby improving system spectral efficiency.

Figure 4:
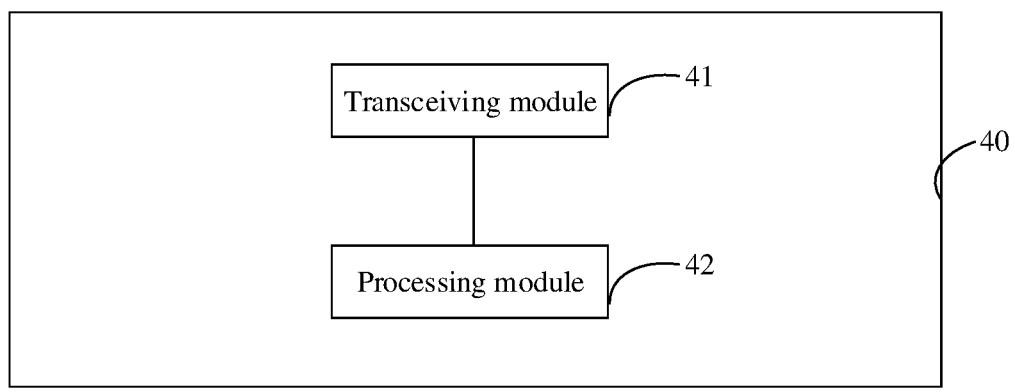
FIG. 4 is a module block diagram of a device for uplink channel multiplexing according to an embodiment of the present disclosure.

As shown in FIG. 4, based on the above method, an embodiment of the present disclosure further provides a device for uplink channel multiplexing 40, including a transceiving module.

The transceiving module 41 is configured such that when a terminal would transmit multiple overlapping Physical Uplink Control Channels (PUCCHs) and/or Physical Uplink Shared Channels (PUSCHs) in a same slot or sub-slot, if one of the PUCCH transmissions or PUSCH transmissions is in response to a Downlink Control Information (DCI) format detected by the terminal, the terminal expects that a start symbol S0 of an earliest PUCCH or PUSCH among the overlapping PUCCHs and/or PUSCHs satisfies a first condition.

Optionally, that the first condition satisfied by the start symbol S0 of the earliest PUCCH or PUSCH among the overlapping PUCCHs and/or PUSCHs includes at least one of the following.

S0 is not before a first symbol, a Cyclic Prefix (CP) of the first symbol starts at a first time after a last symbol of any corresponding PDSCH, and Hybrid Automatic Repeat reQuest-ACK (HARQ-ACK) corresponding to the any corresponding PDSCH has a same first priority index; and/or S0 is not before a second symbol, a CP of the second symbol starts at a second time after the last symbol of any corresponding PDSCH, and the HARQ-ACK corresponding to the any corresponding PDSCH has a same second priority index.

S0 is not before a third symbol, a CP of the third symbol starts at a third time after a last symbol of any Semi-Persistent Scheduling (SPS) PDSCH release, and an HARQ-ACK corresponding to the any SPS PDSCH release has the same first priority index; and/or S0 is not before a fourth symbol, a CP of the fourth symbol starts at a fourth time after the last symbol of any SPS PDSCH release, and the HARQ-ACK corresponding to the any SPS PDSCH release has the same second priority index.

When there is no aperiodic Channel State Information (CSI) report multiplexed in a PUSCH in the overlapping PUCCHs and/or PUSCHs, S0 is not before a fifth symbol, a CP of the fifth symbol starts at a fifth time after a last symbol of any PDCCH with a DCI format that carries and scheduling an overlapping PUSCH and any PDCCH that schedules the PDSCH or SPS PDSCH release, the HARQ-ACK of the PDSCH or the SPS PDSCH release is in an overlapping PUCCH and has the same first priority index, and the any PUSCH has the same first priority index; and/or S0 is not before a sixth symbol, a CP of the sixth symbol starts at a sixth time after the last symbol of any PDCCH with a DCI format scheduling an overlapping PUSCH and any PDCCH that schedules the PDSCH or SPS PDSCH release, where the HARQ-ACK of the PDSCH or the SPS PDSCH release is in an overlapping PUCCH and has the same second priority index, and the any PUSCH has the same second priority index.

When there is an aperiodic CSI report multiplexed in a PUSCH in the overlapping PUCCHs and/or PUSCHs, S0 is not before a seventh symbol, a CP of the seventh symbol starts at a seventh time after the last symbol of any PDCCH with a DCI format scheduling an overlapping PUSCH and any PDCCH that schedules the PDSCH or SPS PDSCH release, where the HARQ-ACK of the PDSCH or the SPS PDSCH release is in an overlapping PUCCH and has the same first priority index, and the any PUSCH has the same first priority index; and/or S0 is not before an eighth symbol, a CP of the eighth symbol starts at an eighth time after the last symbol of any PDCCH with a DCI format scheduling an overlapping PUSCH and any the PDCCH that schedules the PDSCH or SPS PDSCH release, where the HARQ-ACK of the PDSCH or the SPS PDSCH release is in an overlapping PUCCH and has the same second priority index, and any PUSCH has the same second priority index.

Optionally, the device for uplink channel multiplexing 40 further includes a first determination module.

The first determination module 42 is configured to determine a resource set, where the resource set includes a Physical Uplink Control Channel (PUCCH) resource for transmitting the PUCCH in a single slot or sub-slot; and remove the PUCCH resource from the resource set in at least one of the following cases: the PUCCH resource cannot satisfy the first condition, the PUCCH resource cannot satisfy a first latency requirement, or the PUCCH resource cannot satisfy a first reliability requirement.

Optionally, the step of removing the PUCCH resources that do not satisfy a first condition or a first latency requirement or a first reliability requirement from the resource set includes the following operations.

If the PUCCH resource cannot satisfy the first condition, the PUCCH resource is removed from the resource set.

Or, if the PUCCH resource cannot satisfy a first latency requirement, the PUCCH resource is removed from the resource set.

Or, if the PUCCH resource cannot satisfy a first reliability requirement, the PUCCH resource is removed from the resource set.

Optionally, the operation of removing the PUCCH resource from the resource set in the case that the PUCCH resource cannot satisfy a first latency requirement includes the following operation.

In a case that an end symbol of the PUCCH resource is later than X symbols after an end symbol of a first PUCCH resource, removing the PUCCH resource from the resource set, wherein X is an integer, and the first PUCCH resource is a PUCCH resource that is determined according to at least one of a high layer signaling or a physical layer control signaling sent by a network device and carries Uplink Control Information (UCI) of a first priority index.

Optionally, X is predetermined, or configured by the network device by means of the high layer signaling, or a value, indicated by means of physical layer downlink control signaling, in a set determined in a predetermined manner or by high layer signaling configuration.

Optionally, the operation of removing the PUCCH resource from the resource set in the case that the PUCCH resource cannot satisfy a first reliability requirement includes the following operation.

In a case that a maximum bitrate of the PUCCH resource determined according to the high layer signaling is higher than a maximum bitrate of the first PUCCH resource by a first preset value, or the maximum bitrate of the PUCCH resource is higher than a second preset value, removing the PUCCH resource from the resource set, wherein the first PUCCH resource is a PUCCH resource that is determined according to at least one of a high layer signaling or a physical layer control signaling sent by a network device and carries UCI of a first priority index.

Optionally, at least one of the first preset value or the second preset value is predetermined, or configured by a base station by means of the high layer signaling; or a value, indicated by means of physical layer downlink control signaling, in a set determined in a predetermined manner or by high layer signaling configuration.

Optionally, the device for uplink channel multiplexing 40 further includes a second determination module 43.

The second determination module 43 is configured to determine bitrates of the UCI of different priority indexes transmitted in the PUCCH and/or determine content transmitted in the PUCCH in the resource set.

Optionally, the operation of determining the bitrates of the UCI of different priority indexes transmitted in the PUCCH includes the following operations.

The bitrate of UCI of the first priority index is determined to be: a lowest maximum bitrate in the maximum bitrates of the PUCCH indicated according to corresponding high layer configuration and/or physical layer downlink control information, or a bitrate of the PUCCH in the resource set; and the bitrate of UCI of the second priority index is determined to be: the lowest maximum bitrate in the maximum bitrates of the PUCCH indicated according to the corresponding high layer configuration and/or the physical layer downlink control information, or the bitrate of the PUCCH in the resource set.

Optionally, the operation of determining the content transmitted in the PUCCH in the resource set includes the following operations.

The PUCCH is required to transmit a first UCI set, in a case that a number of bits that can be carried by the PUCCH resource, that is determined according to a number of Physical Resource Blocks (PRBs) configured in the PUCCH and a modulation order and bitrate of the first UCI set, is greater than or equal to a number of bits of the first UCI set, a minimum number of PRBs is determined to be a first number of PRBs according to the number of bits of the first UCI set, the number of PRBs configured in the PUCCH, and the modulation order and bitrate of the first UCI set, and the first UCI set is transmitted by using the first number of PRBs.

In a case that the number of bits that can be carried by the PUCCH resource, that is determined according to the number of PRBs configured in the PUCCH and the modulation order and bitrate of the UCI, is less than the number of bits of the first UCI set, a second UCI set is transmitted. The second UCI set satisfies the following conditions:

the second UCI set being a sub-set of the first UCI set, and the number of bits that can be carried by the PUCCH resource, that is determined according to the number of PRBs configured in the PUCCH and the modulation order and bitrate of the second UCI set, being greater than or equal to the number of bits of the second UCI set; and the first UCI set comprising at least one of the following UCI:

a Hybrid Automatic Repeat Request-ACKnowledgement (HARQ-ACK), a Scheduling Request (SR), a wideband Channel State Information (CSI) report, and a sub-band CSI report of the first priority index, wherein a number of bits occupied by the HARQ-ACK of the first priority index is $O_{H\text{-}ACK}$, a number of bits occupied by the SR of the first priority index is $O_{H\text{-}SR}$, and a numbers of bits occupied by each of the wideband CSI report and the sub-band CSI report of the first priority index is $O_{H\text{-}CSI}$; and a HARQ-ACK, an SR, a wideband CSI report, a sub-band CSI report, or a Cyclic Redundancy Check (CRC) of the second priority index, wherein a number of bits occupied by the HARQ-ACK of the second priority index is $O_{L\text{-}ACK}$, a number of bits occupied by the SR of the second priority index is, $O_{L\text{-}SR}$, a numbers of bits occupied by each of the wideband CSI report and the sub-band CSI report of the second priority index is $O_{L\text{-}CSI}$, and a number of bits occupied by the CRC of the second priority index is $O_{CRC}$.

Optionally, the operation of determining the second UCI set includes the following operation.

UCI is selected from the first UCI set according to a first sequence, so as to determine the second UCI set.

The first sequence comprises at least one of the following:
the UCI of the first priority index being selected in preference to the UCI of the second priority index;
the HARQ-ACK and the SR being selected in preference to the CSI when the priority index is the same;
a first part of the CSI being selected in preference to a second part of the CSI when the priority index is the same; or
one with a higher priority among the first part of the CSI and the second part of the CSI being selected in preference when the priority index is the same.

It is to be noted that, the device is the device corresponding to the above method. All implementations in the above method embodiments are applicable to the embodiments of the device, and can achieve the same technical effects. The device may further includes a processing module 44. The processing module is configured to process information that is processed by the transceiving module 41, the first determination module 42 and the second determination module 43.

Figure 5:
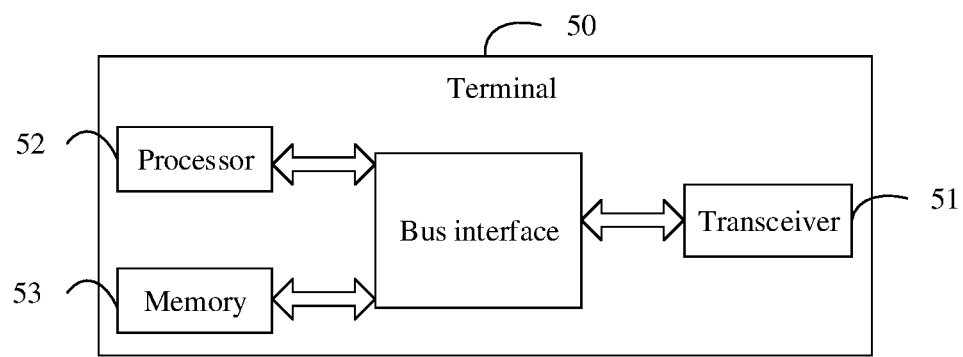
FIG. 5 is a schematic architecture diagram of a terminal according to an embodiment of the present disclosure.

As shown in FIG. 5, an embodiment of the present disclosure further provides a terminal 50, including a transceiver.

The transceiver 51 is configured such that when a terminal would transmit multiple overlapping Physical Uplink Control Channels (PUCCHs) and/or Physical Uplink Shared Channels (PUSCHs) in a same slot or sub-slot, if one of the PUCCH transmissions or PUSCH transmissions is in response to a Downlink Control Information (DCI) format detected by the terminal, the terminal expects that a start symbol S0 of an earliest PUCCH or PUSCH among the overlapping PUCCHs and/or PUSCHs satisfies a first condition.

Optionally, that the first condition satisfied by the start symbol S0 of the earliest PUCCH or PUSCH among the overlapping PUCCHs and/or PUSCHs includes at least one of the following.

S0 is not before a first symbol, a Cyclic Prefix (CP) of the first symbol starts at a first time after a last symbol of any corresponding PDSCH, and Hybrid Automatic Repeat reQuest-ACK (HARQ-ACK) corresponding to the any corresponding PDSCH has a same first priority index; and/or S0 is not before a second symbol, a CP of the second symbol starts at a second time after the last symbol of any corresponding PDSCH, and the HARQ-ACK corresponding to the any corresponding PDSCH has a same second priority index.

S0 is not before a third symbol, a CP of the third symbol starts at a third time after a last symbol of any Semi-Persistent Scheduling (SPS) PDSCH release, and an HARQ-ACK corresponding to the any SPS PDSCH release has the same first priority index; and/or S0 is not before a fourth symbol, a CP of the fourth symbol starts at a fourth time after the last symbol of any SPS PDSCH release, and the HARQ-ACK corresponding to the any SPS PDSCH release has the same second priority index.

When there is no aperiodic Channel State Information (CSI) report multiplexed in a PUSCH in the overlapping PUCCHs and/or PUSCHs, S0 is not before a fifth symbol, a CP of the fifth symbol starts at a fifth time after a last symbol of any PDCCH with a DCI format that carries and scheduling an overlapping PUSCH and any PDCCH that schedules the PDSCH or SPS PDSCH release, the HARQ-ACK of the PDSCH or the SPS PDSCH release is in an overlapping PUCCH and has the same first priority index, and the any PUSCH has the same first priority index; and/or S0 is not before a sixth symbol, a CP of the sixth symbol starts at a sixth time after the last symbol of any PDCCH with a DCI format scheduling an overlapping PUSCH and any PDCCH that schedules the PDSCH or SPS PDSCH release, where the HARQ-ACK of the PDSCH or the SPS PDSCH release is in an overlapping PUCCH and has the same second priority index, and the any PUSCH has the same second priority index.

When there is an aperiodic CSI report multiplexed in a PUSCH in the overlapping PUCCHs and/or PUSCHs, S0 is not before a seventh symbol, a CP of the seventh symbol starts at a seventh time after the last symbol of any PDCCH with a DCI format scheduling an overlapping PUSCH and any PDCCH that schedules the PDSCH or SPS PDSCH release, where the HARQ-ACK of the PDSCH or the SPS PDSCH release is in an overlapping PUCCH and has the same first priority index, and the any PUSCH has the same first priority index; and/or S0 is not before an eighth symbol, a CP of the eighth symbol starts at an eighth time after the last symbol of any PDCCH with a DCI format scheduling an overlapping PUSCH and any the PDCCH that schedules the PDSCH or SPS PDSCH release, where the HARQ-ACK of the PDSCH or the SPS PDSCH release is in an overlapping PUCCH and has the same second priority index, and any PUSCH has the same second priority index.

Optionally, the device for uplink channel multiplexing 50 further includes a processor 52.

The processor 52 is configured to determine a resource set, where the resource set includes a Physical Uplink Control Channel (PUCCH) resource for transmitting the PUCCH in a single slot or sub-slot; and remove the PUCCH resource from the resource set in at least one of the following cases: the PUCCH resource cannot satisfy the first condition, the PUCCH resource cannot satisfy a first latency requirement, or the PUCCH resource cannot satisfy a first reliability requirement.

Optionally, the step of removing the PUCCH resources that do not satisfy a first condition or a first latency requirement or a first reliability requirement from the resource set includes the following operations.

If the PUCCH resource cannot satisfy the first condition, the PUCCH resource is removed from the resource set.

Or, if the PUCCH resource cannot satisfy a first latency requirement, the PUCCH resource is removed from the resource set.

Or, if the PUCCH resource cannot satisfy a first reliability requirement, the PUCCH resource is removed from the resource set.

Optionally, the operation of removing the PUCCH resource from the resource set in the case that the PUCCH resource cannot satisfy a first latency requirement includes the following operation.

In a case that an end symbol of the PUCCH resource is later than X symbols after an end symbol of a first PUCCH resource, removing the PUCCH resource from the resource set, wherein X is an integer, and the first PUCCH resource is a PUCCH resource that is determined according to at least one of a high layer signaling or a physical layer control signaling sent by a network device and carries Uplink Control Information (UCI) of a first priority index.

Optionally, X is predetermined, or configured by the network device by means of the high layer signaling, or a value, indicated by means of physical layer downlink control signaling, in a set determined in a predetermined manner or by high layer signaling configuration.

Optionally, the operation of removing the PUCCH resource from the resource set in the case that the PUCCH resource cannot satisfy a first reliability requirement includes the following operation.

In a case that a maximum bitrate of the PUCCH resource determined according to the high layer signaling is higher than a maximum bitrate of the first PUCCH resource by a first preset value, or the maximum bitrate of the PUCCH resource is higher than a second preset value, removing the PUCCH resource from the resource set, wherein the first PUCCH resource is a PUCCH resource that is determined according to at least one of a high layer signaling or a physical layer control signaling sent by a network device and carries UCI of a first priority index.

Optionally, at least one of the first preset value or the second preset value is predetermined, or configured by a base station by means of the high layer signaling; or a value, indicated by means of physical layer downlink control signaling, in a set determined in a predetermined manner or by high layer signaling configuration.

Optionally, the processor 52 is further configured to determine bitrates of the UCI of different priority indexes transmitted in the PUCCH and/or determine content transmitted in the PUCCH in the resource set.

Optionally, the operation of determining the bitrates of the UCI of different priority indexes transmitted in the PUCCH includes the following operations.

The bitrate of UCI of the first priority index is determined to be: a lowest maximum bitrate in the maximum bitrates of the PUCCH indicated according to corresponding high layer configuration and/or physical layer downlink control information, or a bitrate of the PUCCH in the resource set; and the bitrate of UCI of the second priority index is determined to be: the lowest maximum bitrate in the maximum bitrates of the PUCCH indicated according to the corresponding high layer configuration and/or the physical layer downlink control information, or the bitrate of the PUCCH in the resource set.

Optionally, the operation of determining the content transmitted in the PUCCH in the resource set includes the following operations.

The PUCCH is required to transmit a first UCI set, in a case that a number of bits that can be carried by the PUCCH resource, that is determined according to a number of Physical Resource Blocks (PRBs) configured in the PUCCH and a modulation order and bitrate of the first UCI set, is greater than or equal to a number of bits of the first UCI set, a minimum number of PRBs is determined to be a first number of PRBs according to the number of bits of the first UCI set, the number of PRBs configured in the PUCCH, and the modulation order and bitrate of the first UCI set, and the first UCI set is transmitted by using the first number of PRBs.

In a case that the number of bits that can be carried by the PUCCH resource, that is determined according to the number of PRBs configured in the PUCCH and the modulation order and bitrate of the UCI, is less than the number of bits of the first UCI set, a second UCI set is transmitted. The second UCI set satisfies the following conditions:

the second UCI set being a sub-set of the first UCI set, and
the number of bits that can be carried by the PUCCH resource, that is determined according to the number of PRBs configured in the PUCCH and the modulation order and bitrate of the second UCI set, being greater than or equal to the number of bits of the second UCI set; and the first UCI set comprising at least one of the following UCI:

a Hybrid Automatic Repeat Request-ACKnowledgement (HARQ-ACK), a Scheduling Request (SR), a wideband Channel State Information (CSI) report, and a sub-band CSI report of the first priority index, wherein a number of bits occupied by the HARQ-ACK of the first priority index is $O_{H\text{-}ACK}$, a number of bits occupied by the SR of the first priority index is $O_{H\text{-}SR}$, and a numbers of bits occupied by each of the wideband CSI report and the sub-band CSI report of the first priority index is $O_{H\text{-}CSI}$; and a HARQ-ACK, an SR, a wideband CSI report, a sub-band CSI report, or a Cyclic Redundancy Check (CRC) of the second priority index, wherein a number of bits occupied by the HARQ-ACK of the second priority index is $O_{L\text{-}ACK}$, a number of bits occupied by the SR of the second priority index is $O_{L\text{-}SR}$, a numbers of bits occupied by each of the wideband CSI report and the sub-band CSI report of the second priority index is $O_{L\text{-}CSI}$, and a number of bits occupied by the CRC of the second priority index is $O_{CRC}$.

Optionally, the operation of determining the second UCI set includes the following operation.

UCI is selected from the first UCI set according to a first sequence, so as to determine the second UCI set.

The first sequence comprises at least one of the following:
the UCI of the first priority index being selected in preference to the UCI of the second priority index;
the HARQ-ACK and the SR being selected in preference to the CSI when the priority index is the same;
a first part of the CSI being selected in preference to a second part of the CSI when the priority index is the same; or
one with a higher priority among the first part of the CSI and the second part of the CSI being selected in preference when the priority index is the same.

It is to be noted that, all implementations in the above method are applicable to the embodiments of the terminal, and can achieve the same technical effects. The terminal may further include a memory 53, the transceiver 51 and the processor 52. The transceiver 51 may be connected to the memory 53 by means of a bus interface. The function of the transceiver 51 may be implemented by the processor 52. The function of the processor 52 may also be implemented by the transceiver 51.

An embodiment of the present disclosure further provides a method for uplink channel multiplexing. The method is applied to a terminal and includes the following operation.

A resource set is determined, and includes a Physical Uplink Control Channel (PUCCH) resource for transmitting the PUCCH in a single slot or sub-slot; and PUCCH resource that does not satisfy a first condition or a first latency requirement or a first reliability requirement is removed from the resource set.

Optionally, the operation of removing the PUCCH resource that does not satisfy a first condition or a first latency requirement or a first reliability requirement from the resource set includes the following operations.

If the PUCCH resource cannot satisfy the first condition, the PUCCH resource is removed from the resource set.

Or, if the PUCCH resource cannot satisfy a first latency requirement, the PUCCH resource is removed from the resource set.

Or, if the PUCCH resource cannot satisfy a first reliability requirement, the PUCCH resource is removed from the resource set.

Optionally, the operation of removing the PUCCH resource from the resource set in the case that the PUCCH resource cannot satisfy a first latency requirement includes the following operation.

In a case that an end symbol of the PUCCH resource is later than X symbols after an end symbol of a first PUCCH resource, removing the PUCCH resource from the resource set, wherein X is an integer, and the first PUCCH resource is a PUCCH resource that is determined according to at least one of a high layer signaling or a physical layer control signaling sent by a network device and carries Uplink Control Information (UCI) of a first priority index.

Optionally, X is predetermined, or configured by the network device by means of the high layer signaling, or a value, indicated by means of physical layer downlink control signaling, in a set determined in a predetermined manner or by high layer signaling configuration.

Optionally, the operation of removing the PUCCH resource from the resource set in the case that the PUCCH resource cannot satisfy a first reliability requirement includes the following operation.

In a case that a maximum bitrate of the PUCCH resource determined according to the high layer signaling is higher than a maximum bitrate of the first PUCCH resource by a first preset value, or the maximum bitrate of the PUCCH resource is higher than a second preset value, removing the PUCCH resource from the resource set, wherein the first PUCCH resource is a PUCCH resource that is determined according to at least one of a high layer signaling or a physical layer control signaling sent by a network device and carries UCI of a first priority index.

Optionally, at least one of the first preset value or the second preset value is predetermined, or configured by a base station by means of the high layer signaling; or a value, indicated by means of physical layer downlink control signaling, in a set determined in a predetermined manner or by high layer signaling configuration.

An embodiment of the present disclosure further provides a device for uplink channel multiplexing. The device is applied to a terminal and includes a determination module.

The determination module is configured to determine a resource set, where the resource set includes a PUCCH resource for transmitting the PUCCH in a single slot or sub-slot; and remove PUCCH resource that does not satisfy a first condition or a first latency requirement or a first reliability requirement from the resource set.

It is to be noted that, the device is the device corresponding to the above method. All implementations in the above method embodiments are applicable to the embodiments of the device, and can achieve the same technical effects.

An embodiment of the present disclosure further provides a terminal, including a processor.

The processor is configured to determine a resource set, where the resource set includes a PUCCH resource for transmitting the PUCCH in a single slot or sub-slot; and remove PUCCH resource that does not satisfy a first condition or a first latency requirement or a first reliability requirement from the resource set.

It is to be noted that, the terminal is a terminal corresponding to the above method. All implementations in the above method are applicable to the embodiments of the terminal, and can achieve the same technical effects.

An embodiment of the present disclosure further provides a method for uplink channel multiplexing. The method is applied to a terminal and includes the following operation.

Bitrates of the UCI of different priority indexes transmitted in the PUCCH are determined and/or content transmitted in the PUCCH in the resource set is determined.

Optionally, the operation of determining the bitrates of the UCI of different priority indexes transmitted in the PUCCH includes the following operations.

A bitrate of UCI of a first priority index is determined to be: a lowest maximum bitrate in the maximum bitrates of the PUCCH indicated according to corresponding high layer configuration and/or physical layer downlink control information, or a bitrate of the PUCCH in the resource set; and a bitrate of UCI of a second priority index is determined to be: the lowest maximum bitrate in the maximum bitrates of the PUCCH indicated according to the corresponding high layer configuration and/or the physical layer downlink control information, or the bitrate of the PUCCH in the resource set.

Optionally, the operation of determining the content transmitted in the PUCCH in the resource set includes the following operations.

The PUCCH is required to transmit a first UCI set, in a case that a number of bits that can be carried by the PUCCH resource, that is determined according to a number of Physical Resource Blocks (PRBs) configured in the PUCCH and a modulation order and bitrate of the first UCI set, is greater than or equal to a number of bits of the first UCI set, a minimum number of PRBs is determined to be a first number of PRBs according to the number of bits of the first UCI set, the number of PRBs configured in the PUCCH, and the modulation order and bitrate of the first UCI set, and the first UCI set is transmitted by using the first number of PRBs.

In a case that the number of bits that can be carried by the PUCCH resource, that is determined according to the number of PRBs configured in the PUCCH and the modulation order and bitrate of the UCI, is less than the number of bits of the first UCI set, transmitting a second UCI set, wherein the second UCI set satisfies the following conditions:

the second UCI set being a sub-set of the first UCI set, and
the number of bits that can be carried by the PUCCH resource, that is determined according to the number of PRBs configured in the PUCCH and the modulation order and bitrate of the second UCI set, being greater than or equal to the number of bits of the second UCI set; and
the first UCI set comprising at least one of the following UCI:
a Hybrid Automatic Repeat Request-ACKnowledgement (HARQ-ACK), a Scheduling Request (SR), a wideband Channel State Information (CSI) report, and a sub-band CSI report of the first priority index, wherein a number of bits occupied by the HARQ-ACK of the first priority index is $O_{H-ACK}$, a number of bits occupied by the SR of the first priority index is $O_{H-SR}$, and a numbers of bits occupied by each of the wideband CSI report and the sub-band CSI report of the first priority index is $O_{H-CSI}$; and
a HARQ-ACK, an SR, a wideband CSI report, a sub-band CSI report, or a Cyclic Redundancy Check (CRC) of the second priority index, wherein a number of bits occupied by the HARQ-ACK of the second priority index is $O_{L-ACK}$, a number of bits occupied by the SR of the second priority index is $O_{L-SR}$, a numbers of bits occupied by each of the wideband CSI report and the sub-band CSI report of the second priority index is $O_{L-CSI}$, and a number of bits occupied by the CRC of the second priority index is $O_{CRC}$.

Optionally, the operation of determining the second UCI set includes the following operation.

UCI is selected from the first UCI set according to a first sequence, so as to determine the second UCI set.

The first sequence comprises at least one of the following.
the UCI of the first priority index being selected in preference to the UCI of the second priority index;
the HARQ-ACK and the SR being selected in preference to the CSI when the priority index is the same;
a first part of the CSI being selected in preference to a second part of the CSI when the priority index is the same; or
one with a higher priority among the first part of the CSI and the second part of the CSI being selected in preference when the priority index is the same.

It is to be noted that, the device is the device corresponding to the above method. All implementations in the above method embodiments are applicable to the embodiments of the device, and can achieve the same technical effects.

An embodiment of the present disclosure further provides a device for uplink channel multiplexing. The device is applied to a terminal and includes a processor.

The processor is configured to determine bitrates of UCI of different priority indexes transmitted on PUCCH and/or determine content transmitted in the PUCCH in a resource set.

An embodiment of the present disclosure further provides a terminal, including a processor.

The processor is configured to determine bitrates of UCI of different priority indexes transmitted on PUCCH and/or determine content transmitted in the PUCCH in a resource set.

It is to be noted that, the terminal is the terminal corresponding to the above method. All implementations in the above method are applicable to the embodiments of the terminal, and can achieve the same technical effects.

An embodiment of the present disclosure further provides a communication device, including a processor and a memory storing a computer program. When the computer program is operated by the processor, the method described above is executed. All implementations in the above method are applicable to the embodiments of the terminal, and can achieve the same technical effects.

An embodiment of the present disclosure further provides a computer-readable storage medium, including instructions. When the instruction is run in a computer, the computer performs the method described above. All implementations in the above method are applicable to the embodiments of the terminal, and can achieve the same technical effects.

According to the above embodiments of the present disclosure, by means of determining processing timelines for different services respectively, removing the PUCCH resource that does not satisfy the processing timelines or latency from a PUCCH resource set and coding different uplink services respectively, error can be avoided, the processing case that a base station cannot control a terminal can be avoided, and the latency and reliability requirements of URLLC services can also be satisfied, thereby improving system spectral efficiency.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such implementation shall fall within the scope of the present disclosure.

Those skilled in the art may clearly learn about that specific working processes of the system, device, and units described above may refer to the corresponding processes in the above method embodiments and will not be elaborated herein for ease and briefness of description.

In the embodiments provided by the present disclosure, it is to be understood that the disclosed device and method may be implemented in other ways. For example, the device embodiment described above is only schematic, and for example, division of the units is only logic function division, and other division manners may be adopted during practical implementation. For another example, a plurality of units or components may be combined or integrated into another system, or some characteristics may be neglected or not executed. In addition, the displayed or discussed mutual coupling or direct coupling or communication connection may be indirect coupling or communication connection through some interfaces, devices or units, and may be in electrical, mechanical or other forms.

The units described as separate components may or may not be physically separated. The components displayed as units may or may not be physical units, that is, the components may be located in one place, or may be distributed on the plurality of network units. Part or all of the units may be selected according to actual requirements to achieve the purposes of the solutions of this embodiment.

In addition, the functional units in the various embodiments of the present disclosure may be integrated into one processing unit, or each unit may exist alone physically, or two or more than two units may be integrated into one unit.

If the function is implemented in the form of the software functional unit and sold or used as an independent product, it can be stored in the computer readable storage medium. Based on this understanding, the technical solutions of the present disclosure essentially or the parts that contribute to the prior art, or part of the technical solutions can be embodied in the form of a software product. The computer software product is stored in a storage medium, including a plurality of instructions for causing a computer device (which may be a personal computer, a server, or a network device, and the like) to execute all or part of the steps of the method described in the various embodiments of the present disclosure. The foregoing storage medium includes: a USB flash disk, a mobile Hard Disk Drive (HDD), a Read-Only Memory (ROM), a Random Access Memory (RAM) and various media that can store program codes, such as a magnetic disk, or an optical disk.

In addition, it is to be noted that, in the device and method of the present disclosure, it is obvious that each component or each step can be decomposed and/or recombined. These decompositions and/or re-combinations should be considered equivalent solutions of the present disclosure. In addition, steps of performing the above series of processes may naturally and chronologically be performed according to a described order, but need not necessarily be performed in chronological order, and some steps may be performed in parallel or independently of each other. Those of ordinary skill in the art can understand that all or any steps or components of the method and device of the present disclosure may be implemented in any computing device (including a processor, a storage medium, and the like) or a network of the computing device in hardware, firmware, software, or a combination thereof, which can be implemented by those of ordinary skill in the art using their basic programming skills after reading the description of the present disclosure.

Therefore, the objective of the present disclosure may also be achieved by running a program or a set of programs on any computing devices. The computing device may be a well-known general device. Therefore, the objective of the present disclosure may also achieved merely by providing a program product including a program code for implementing the method or device. That is to say, such a program product also constitutes the present disclosure, and a storage medium in which such a program product is stored also constitutes the present disclosure. It is obvious that the storage medium may be any well-known storage medium or any storage medium developed in the future. It is to be noted that, in the device and method of the present disclosure, it is obvious that each component or each step can be decomposed and/or recombined. These decompositions and/or re-combinations should be considered equivalent solutions of the present disclosure. In addition, steps of performing the above series of processes may naturally and chronologically be performed according to a described order, but need not necessarily be performed in chronological order. Some steps may be performed in parallel or independently of each other.

The above description is merely preferred implementations of this application, and it should be noted that persons of ordinary skill in the art may also make several improvements and refinements without departing from the principle of this application, and it should not be considered that these improvements and refinements shall fall within the protection scope of this application.

The invention claimed is:

1. A method for uplink channel multiplexing, applied to a terminal and comprising:
   when a terminal would transmit multiple overlapping Physical Uplink Control Channels (PUCCHs) in a same slot or sub-slot, when one of the PUCCH transmissions is in response to a Downlink Control Information (DCI) format detected by the terminal, determining, by the terminal, whether a start symbol S0 of an earliest PUCCH among the overlapping PUCCHs satisfies a first condition;
   wherein the first condition satisfied by the start symbol S0 of the earliest PUCCH among the overlapping PUCCHs comprises at least one of the following:
      the start symbol S0 is not before a first symbol, a Cyclic Prefix (CP) of the first symbol S0 starts at a first time after a last symbol of any corresponding Physical Downlink Shared Channel (PDSCH), and Hybrid Automatic Repeat reQuest-ACKnowledgement (HARQ-ACK) corresponding to the any corresponding PDSCH has a same first priority index; and
      the start symbol S0 is not before a third symbol, a CP of the third symbol starts at a third time after a last symbol of any Semi-Persistent Scheduling (SPS) PDSCH release, and an HARQ-ACK corresponding to the any SPS PDSCH release has the same first priority index,
   wherein the method further comprises:
      determining a resource set, wherein the resource set comprises a PUCCH resource for transmitting the PUCCH in a single slot or sub-slot; and
      removing the PUCCH resource from the resource set in a case that the PUCCH resource cannot satisfy the first condition.

2. The method for uplink channel multiplexing of claim 1, further comprising at least one of the following:
   determining bitrates of Uplink Control Information (UCI) of different priority indexes transmitted on a PUCCH; or
   determining content transmitted on the PUCCH in the resource set.

3. The method for uplink channel multiplexing of claim 2, wherein the determining content transmitted on the PUCCH in the resource set comprises:
   the PUCCH being required to transmit a first UCI set, in a case that a number of bits that can be carried by the PUCCH resource, that is determined according to a number of Physical Resource Blocks (PRBs) configured in the PUCCH and a modulation order and bitrate of the first UCI set, is greater than or equal to a number of bits of the first UCI set, determining a minimum number of PRBs to be a first number of PRBs according to the number of bits of the first UCI set, the number of PRBs configured in the PUCCH, and the modulation order and bitrate of the first UCI set, and transmitting the first UCI set by using the first number of PRBs;
   in a case that the number of bits that can be carried by the PUCCH resource, that is determined according to the number of PRBs configured in the PUCCH and the modulation order and bitrate of the UCI, is less than the number of bits of the first UCI set, transmitting a second UCI set, wherein the second UCI set satisfies the following conditions:

the second UCI set being a sub-set of the first UCI set, and the number of bits that can be carried by the PUCCH resource, that is determined according to the number of PRBs configured in the PUCCH and the modulation order and bitrate of the second UCI set, being greater than or equal to the number of bits of the second UCI set; and the first UCI set comprising at least one of the following UCI:

a HARQ-ACK, a Scheduling Request (SR), a wideband Channel State Information (CSI) report, and a sub-band CSI report of a first priority index, wherein a number of bits occupied by the HARQ-ACK of the first priority index is $O_{H\text{-}ACK}$, a number of bits occupied by the SR of the first priority index is $O_{H\text{-}SR}$, and a numbers of bits occupied by each of the wideband CSI report and the sub-band CSI report of the first priority index is $O_{H\text{-}CSI}$; and a HARQ-ACK, an SR, a wideband CSI report, a sub-band CSI report, or a Cyclic Redundancy Check (CRC) of a second priority index, wherein a number of bits occupied by the HARQ-ACK of the second priority index is $O_{L\text{-}ACK}$, a number of bits occupied by the SR of the second priority index is $O_{L\text{-}SR}$, a numbers of bits occupied by each of the wideband CSI report and the sub-band CSI report of the second priority index is $O_{L\text{-}CSI}$, and a number of bits occupied by the CRC of the second priority index is $O_{CRC}$.

4. The method for uplink channel multiplexing of claim 3, wherein the determining the second UCI set comprises:

selecting UCI from the first UCI set according to a first sequence, so as to determine the second UCI set;

wherein the first sequence comprises at least one of the following:

the UCI of the first priority index being selected in preference to the UCI of the second priority index;

the HARQ-ACK and the SR being selected in preference to the CSI when the priority index is the same;

a first part of the CSI being selected in preference to a second part of the CSI when the priority index is the same; or one with a higher priority among the first part of the CSI and the second part of the CSI being selected in preference when the priority index is the same.

5. A terminal, comprising:

a memory storing instructions; and a processor, configured to, when executing the instructions, perform the method of claim 1.

* * * * *